United States Patent [19]

Tanaka et al.

[11] Patent Number: 4,659,104
[45] Date of Patent: Apr. 21, 1987

[54] AUTOMATIC LEVEL CONTROL SYSTEM FOR AUTOMOTIVE VEHICLE WITH FAIL-SAFE SYSTEM THEREFOR

[75] Inventors: Haruto Tanaka, Yokohama; Kazunobu Kawabata, Yokosuka, both of Japan

[73] Assignee: Nissan Motor Company, Limited, Yokohama, Japan

[21] Appl. No.: 795,499

[22] Filed: Nov. 6, 1985

[30] Foreign Application Priority Data

Dec. 20, 1984 [JP] Japan .................. 59-269305

[51] Int. Cl.⁴ .............................. B60G 11/26
[52] U.S. Cl. ..................... 280/707; 280/714
[58] Field of Search ............... 280/702, 704, 714, 6 H

[56] References Cited

U.S. PATENT DOCUMENTS 3,752,497 8/1973 Enke et al. ............ 280/702
4,586,728 5/1986 Tokunaga et al. ......... 280/707

FOREIGN PATENT DOCUMENTS

2736026 2/1978 Fed. Rep. of Germany ...... 280/707
59-6105 1/1984 Japan .
623759 9/1978 U.S.S.R. ................... 280/707

Primary Examiner—David M. Mitchell
Assistant Examiner—Ross Weaver
Attorney, Agent, or Firm—Schwartz, Jeffery, Schwaab, Mack, Blumenthal & Evans

[57] ABSTRACT

An automotive height control system for an automotive vehicle includes an actuator disposed within a vehicle suspension system for adjusting the vertical dimension between a vehicle body and a wheel axle. The actuator is connected to a controller to receive a control signal which orders adjustment of the vehicle height. The height control system further includes a damping characteristics controller cooperative with the actuator for adjusting damping characteristics of the suspension system according to the vehicle height. In addition, the system is provided with a vehicle height sensor which monitors the height of the vehicle from the road surface and provides a vehicle height indicative signal. A fail-safe system detects abnormal height conditions as indicated by the vehicle height indicative signal to produce a fail-safe signal. The actuator and the damping characteristics controller respond to the fail-safe signal by equalizing their internal pressures.

19 Claims, 7 Drawing Figures

AUTOMATIC LEVEL CONTROL SYSTEM FOR AUTOMOTIVE VEHICLE WITH FAIL-SAFE SYSTEM THEREFOR

BACKGROUND OF THE INVENTION

The present invention relates generally to a height or level control system for an automotive vehicle, which automatically controls vehicular profile depending upon the load on the vehicle and/or vehicular driving conditions. More specifically, the invention relates to an automatic height control system for an automotive vehicle which includes a fail-safe system ensuring maintenance of an acceptable vehicle profile.

Automatic level regulators or vehicular height control systems have been proposed in various constructions and systems. Some of such systems are designed to control not only the vehicular profile but also vehicular height, i.e. road clearance, depending upon vehicle driving conditions and road conditions. One typical construction of the vehicle height control system employs a pressure control for a working fluid in the vehicular suspension system. The fluid pressure is introduced and discharged from a height-control pressure chamber installed in the vehicular suspension system so as to control the vehicle height and/or vehicular profile. However, the damping characteristics of the suspension system tend to vary with the fluid pressure in the height-control pressure chamber.

Specifically, when the fluid pressure in the high-control pressure chamber increases, the suspension system becomes harder. On the other hand, by reducing the fluid pressure in the pressure chamber, the suspension system naturally becomes softer. This sometimes affects drivability and/or riding comfort of the vehicle. Therefore, in order to compensate for this, a vehicle height-control system cooperative with a suspension control system has been proposed to adjust the damping characteristics of the suspension system, in the prior art. In this conventional vehicle height control system cooperating with the suspension control system, primary and auxiliary pressure chambers respectively control the vehicle height and/or profile and the damping characteristics of the suspension system. A pressure control valve is disposed between the primary and auxiliary pressure chambers and within a communication passage. In this case, when the suspension system is to be stiffened, the pressure control valve is closed to block fluid communication between the primary and the auxiliary fluid chambers. In this condition, if height adjustment is performed by adjusting the fluid pressure in the primary chamber, the pressure in the primary and auxiliary chambers differ to a significant exert. If height control is performed to lower the vehicle height under these conditions, the vehicle height would be lowered excessively, causing a temporary, unsatable vehicle driving state.

SUMMARY OF THE INVENTION

In view of the above-mentioned drawback in the conventional vehicle height control system, the present invention intends to provide a novel vehicle height control system which can solve this problem in the prior art.

Therefore, it is an object of the present invention to provide a vehicle height control system which can ensure maintenance of driving stability under any conditions.

Another and more specific object of the invention is to provide a vehicle height control system cooperative with a fail-safe system which detects abnormal of vehicle height conditions and performs a fail-safe operation to maintain an acceptable vehicle driving stability level.

In order to accomplish the aforementioned and other objects, an automotive height control system for an automotive vehicle, according to the present invention, includes an actuator disposed within a vehicle suspension system for adjusting the vertical dimension between a vehicle body and a wheel axle. The actuator adjusts the vehicle height in response to and in accordance with a contrwi signal from the controller. The height control system also includes a damping characteristics controller cooperative with the actuator for adjusting the damping characteristics of the suspension system according to the vehicle height. In addition, the system is provided with a vehicle height sensor which monitors the height of the vehicle from the road surface and outputs a vehicle height-indicative signal. A fail-safe system detects abnormal height conditions on the basis of the vehicle height indicative signal to produce a fail-safe signal. The actuator and the damping characteristics controller respond to the fail-safe signal by adjusting the respective internal pressures to the same level.

According to one aspect of the invention, a height control system for an automotive vehicle comprises an actuator means, disposed between a vehicle body and a vehicular wheel axle, for adjusting the vertical separation between the vehicle body and the wheel axle by controlling an actuator so as to adjust vehicle height to a given height, a damper control means, cooperative with the actuator means, for adjusting damping characteristics of a vehicular suspension system, which damper control means adjusts the damping characteristics by adjusting a damper pressure relative to the actuator pressure, a vehicle height sensor for monitoring vehicle height and producing a vehicle height indicative signal, a detector responsive to the vehicle height indicative signal for detecting when the vehicle height lies outside of a predetermined height range, and a controller responsive to the detector detecting vehicle height outside of the predetermined height range for operating the actuator means to adjust the actuator pressure so as to adjust the vehicle height to within the predetermined height range, the controller also operating the damper control means so as to hold the damper pressure substantially equal to the actuator pressure during height adjustment.

The actuator means comprises a pneumatic actuator connected to a pneumatic pressure source through a pressure supply circuit, and a pressure control valve establishing and blocking fluid communication between the pnuematic actuator and the pneumatic pressure source, and wherein the controller operates the pressure control valve in order to adjust the actuator pressure.

The damper control means comprises a pneumatic pressure reservoir connected to the actuator for fluid communication therebetween, and a damper control valve disposed between the actuator and the pneumatic pressure reservoir for establishing and blocking fluid communication therebetween, and the controller opens the damper control valve to establish fluid communication between the actuator and the pneumatic pressure reservoir.

The actuator means includes pneumatic actuators associated with the vehicular suspension system, one arranged at each of front and rear suspensions and adapted to adjust the vertical separation between the vehicle body and the wheel axle at the corresponding suspension independently of other of the actuators, and the damper control means includes pneumatic chambers, one connected to each one of the pneumatic actuators.

Each of the actuators comprises a pneumatic chamber connected to a pneumatic pressure source through a pressure supply circuit, and a pressure control valve establishing and blocking fluid communication between the pneumatic chamber and the pneumatic pressure source, and the controller operates the pressure control valve in order to adjusting the actuator pressure.

The damper control means further comprises a damper control valve disposed between the pneumatic chamber of the actuator and the pneumatic chamber of the damper control means for establishing and blocking fluid communication therebetween, and the controller opens the damper control valve to establish fluid communication between the pneumatic chamber of the actuator and the pneumatic chamber of the damper control means so as to expand the effective volume of the pneumatic chamber of the actuator and thereby soften the damping characteristics of the suspension system.

The controller opens all of the damper control valves during height adjustment by any one of the pneumatic actuators.

The vehicle height control system further comprises a vehicle speed sensor monitoring vehicle speed and producing a vehicle speed indicative signal, and the controller is responsive to a vehicle speed indicative signal value indicative of the vehicle being at rest to operate the damper control means to harden the suspension system.

The vehicle height control system the actuator means includes pneumatic actuators associated with the vehicular suspension system, one arranged at each of front and rear suspensions and adapted to adjust the vertical separation between the vehicle body and the wheel axle at the corresponding suspension independently of other of the actuators, and the damper control means includes pneumatic chambers, one connected to each one of the pneumatic actuators.

Each of the actuators comprises a pneumatic chamber connected to a pneumatic pressure source through a pressure supply circuit, and a pressure control valve establishing and blocking fluid communication between the pneumatic chamber and the pneumatic pressure source, and the controller operates the pressure control valve in order to adjusting the actuator pressure.

The damper control means further comprises a damper control valve disposed between the pneumatic chamber of the actuator and the pneumatic chamber of the damper control means for establishing and blocking fluid communication therebetween, and the controller opens the damper control valve to establish fluid communication between the pneumatic chamber of the actuator and the pneumatic chamber of the damper control means so as to expand the effective volume of the pneumatic chamber of the actuator and thereby soften the damping characteristics of the suspension system.

The controller opens all of the damper control valves during height adjustment by any one of the pneumatic actuators.

According to another aspect of the invention, a height control system for an automotive vehicle comprises a suspension strut disposed between a vehicle body and a vehicular wheel axle, a first pneumatic chamber associated with the suspension strut and adapted to adjust the vertical separation between the vehicle body and the wheel axle by controlling a pressure therein so as to hold vehicle height at a given height, a second pneumatic chamber connected to the first pneumatic chamber through a communication passage, a pneumatic pressure supply circuit connected to the first pneumatic chamber for introducing and exhausting the pneumatic pressure into and from the first pneumatic chamber for adjusting the pneumatic pressure within the latter, a pressure control valve means disposed within the pneumatic pressure supply circuit, for controlling introduction and exhausting of the pneumatic pressure in the first pneumatic chamber, a damper control valve means disposed within the communication passage for establishing and blocking communication between the first and second pneumatic chambers for adjusting the effective volume of the first pneumatic chamber, a vehicle height sensor for monitoring vehicle height and producing a vehicle height indicative signal, a detector responsive to the vehicle height indicative signal for detecting when the vehicle height lies outside of a predetermined height range, and a controller responsive to the detector detecting the vehicle height outside of the predetermined height range for operating the pressure control valve means so as to adjust vehicle height to within the predetermined height range, the controller also operating the damper control valve means so as to hold the damper control valve means open during vehicle height adjustment.

According to a further aspect of the invention, in a height control system for an automotive vehicle comprises a suspension trut disposed between a vehicle body and a vehicular wheel axle, a first pneumatic chamber associated with the suspension strut and adapted to adjust the vertical separation between the vehicle body and the wheel axle by controlling a pressure therein so as to hold vehicle height at a given height, a second pneumatic chamber connected to the first pneumatic chamber through a communication passage, a pneumatic pressure supply circuit connected to the first pneumatic chamber for introducing and exhausting the pneumatic pressure into and from the first pneumatic chamber for adjusting the pneumatic pressure within the latter, a pressure control valve means disposed within the pneumatic pressure supply circuit, for controlling introduction and exhausting of the pneumatic pressure in the first pneumatic chamber, a damper control valve means disposed within the communication passage for establishing and blocking communication between the first and second pneumatic chambers for adjusting the effective volume of the first pneumatic chamber, a vehicle height sensor for monitoring vehicle height and producing a vehicle height indicative signal, a detector responsive to the vehicle height indicative signal for detecting when the vehicle height lies outside of a predetermined height range, and a controller for controlling operation of the pressure control valve means and the damper control valve means.

A process for performing vehicle height control comprising the steps of:

monitoring varition of the vehicle height indicative signal value and detecting when vehicle height lies outside of a predetermined range;

opening the damper control valve in response to a vehicle height indicative signal value indicative of a vehicle height outside of the predetermined range;

measuring elapsed time starting from detection of the vehicle height indicative signal value indicative of vehicle height outside of the predetermined range and continuing for as long as the vehicle height remains outside of the predetermined range;

when the elapsed time exceeds a predetermined period, operating the pressure control valve so as to adjust pnuematic pressure in the first pneumatic chamber in order to return the vehicle height within the predetermined range; and holding the damper control valve opening during the pressure control valve operation step.

The process further comprises a step of monitoring vehicle speed and holding the damper control valve closed while the vehicle speed is zero.

The pressure control valve operation and damper control valve operation steps are performed for each of front and rear suspension systems so as to adjust the vertical separation between the vehicle body and the wheel axle at each of the suspension systems independently.

The process further comprises a step of holding the damper control valve means open during pressure control valve operation performed for any one of the suspension systems.

DESCRIPTION OF THE PREFERRED EMBODIMENT

Figure 1:
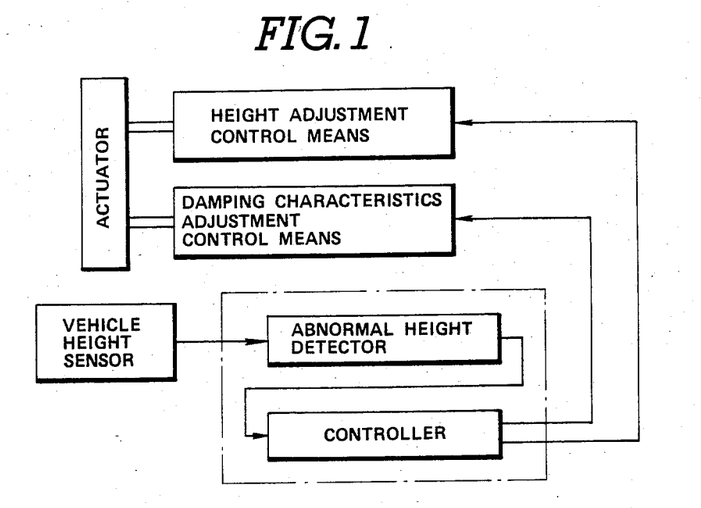
FIG. 1 is a schematic and diagrammatic illustration of an automotive height control system for an automotive vehicle according to the present invention.

Referring now to the drawings, particularly to FIG. 1, an automotive height control system according to the present invention includes an actuator disposed between the vehicle body and a wheel axle for adjusting the distance therebetween. The actuator employed in the shown embodiment comprises a pneumatically operated actuator which adjusts the vehicle height, i.e. the vehicle body elevation relative to the road surface. The actuator also adjusts the damping characteristics or stiffness of the vehicle suspension system. In order to perform vehicle height control and damping characteristics control, the actuator is connected to a pneumatic pressure source through a communication passage.

A height adjustment control means cooperates with the actuator. The height adjustment control means, in the present invention, comprises a height adjusting pressure control valve disposed in the pneumatic pressure communication passage between the pneumatic pressure source and the actuator. In addition, a damping characteristics adjustment control means cooperates with the actuator. The damping characteristics adjustment control means also comprises a pressure control valve disposed within the pneumatic pressure communication passage between the pneumatic pressure source and the actuator, which pressure control valve will be referred to hereafter as "damping characteristics adjustment pressure control valve".

The height adjusting pressure control valve and the damping characteristics adjustment pressure control valve are connected to a controller to receive control signals which order the valves to switch between open and closed positions. Although it is not illustrated in FIG. 1, the controller is connected to various sensors, such as a vehicle speed sensor, to receive sensor signals which serve as height and damping characteristics adjustment parameters. Based on the preselected control parameters, the controller detects the vehicle driving conditions, derives the control signals, and operates the height adjusting pressure control valve and the damping characteristics adjustment pressure control valve.

The controller is also connected to an abnormal height detector which is, in turn, connected to a vehicle height sensor. The vehicle height sensor monitors the vehicle height relative to the road surface and produces a vehicle height-indicative signal having a value proportional to the vehicle height. When the abnormal height detector detects abnormal vehicle height conditions indicated by the vehicle height-indicative signal, it sends an abnormal height-indicative signal to the controller.

The controller responds to the abnormal height-indicative signal by initiating a fail-safe operation in which it outputs control signals which operate the height adjustment pressure control valve and the damping characteristics adjustment pressure control valve such that the pneumatic pressure controlling the vehicle height and the pneumatic pressure controlling damping characteristics in the actuator become equal to each other and are held at equal levels.

With this arrangement, vehicle height variation in excess of acceptable levels can be satisfactorily and successfully prevented.

Figure 2:
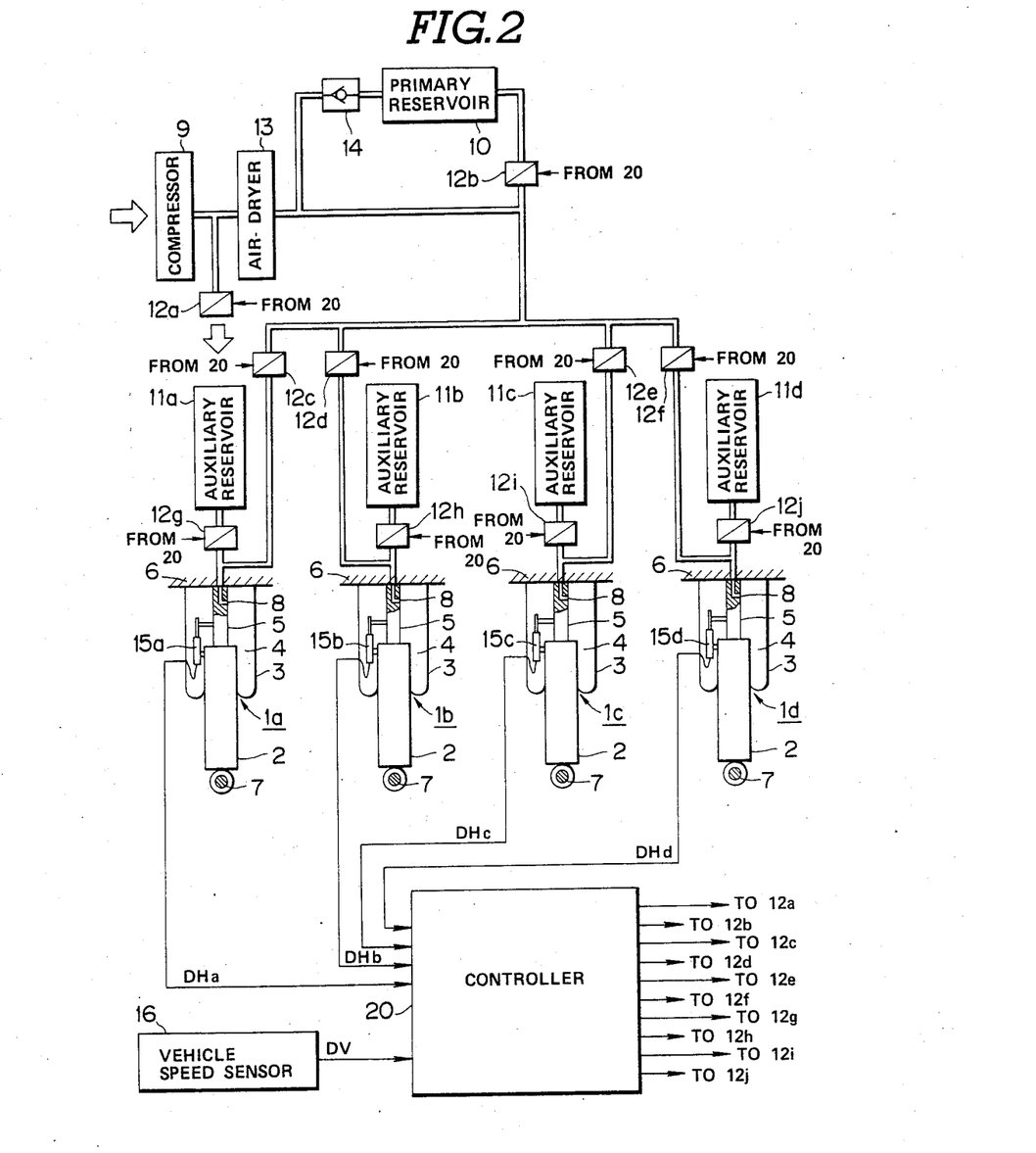
FIG. 2 is a diagramatic illustration of the preferred embodiment of the automotive vehicle height control system according to the present invention.

The preferred embodiment of the vehicle height control system according to the invention will be described in detail with reference to FIGS. 2 to 7. As shown in FIG. 2, the preferred embodiment of the height control system, according to the invention, has a front-left suspension system 1a suspending a front-left wheel from the vehicle body, a front-right suspension system 1b suspending a front-right wheel from the vehicle body, a rear-left suspension system 1c suspending a rear-left wheel from the vehicle body, and a rear-right suspension system 1d suspending a rear-right wheel from the vehicle body.

Each suspension system generally comprises a shock absorber 2, such as a hydraulic shock absorber, connected to the vehicle body at the top of a piston rod 5 thereof and to a wheel axle 7 at the lower end of the shock absorber cylinder. A rolling diaphragm 3 surrounds the piston rod 5 of the shock absorber 2 to define a pneumatic chamber 4 which serves as the actuator.

The upper end of the rolling diaphragm 3 is sealingly secured to the vehicle body and the lower end thereof is sealingly secured to the outer periphery of the shock absorber cylinder or a suspension strut covering the shock absorber.

The piston rod 5 has a pneumatic pressure passage which opens into the pneumatic chamber 4 at one end. The other end of the pneumatic pressure passage 8 defined in the piston rod 5 is connected to a pressure control circuit. The pressure control circuit includes a compressor 9 serving as a pneumatic pressure source. Also, the pressure control circuit includes an air dehumidifier 13, a primary reservoir tank 10, a check valve 14 between the latter two, four auxiliary reservoir tanks 11a, 11b, 11c and 11d, and a total of ten pressure control valves 12a to 12j.

The pressure control valve 12a is disposed in a vent line connected to a point between the compressor 9 and the air dehumidifier 13. The pressure control valve 12a is ordered to open when the pneumatic pressure in the pressure control circuit is to be reduced by discharging to atmosphere. The pressure control valve 12b controls access to the outlet side of the primary reservoir tank 10. The pressure control valve 12b is ordered to open when the pneumatic pressure accumulated in the primary reservoir chamber 10 is to be delivered to the pneumatic chambers 4 of respective suspension systems. The check valve 14 allows input of pneumatic pressure into the primary reservoir 10 while preventing loss of pressure therefrom.

The pressure control valves 12c, 12d, 12e and 12f respectively control communication between the primary reservoir 10 and respectively corresponding pneumatic chambers 4. The pressure control valves 12c, 12d, 12e and 12f are ordered to open when pneumatic pressure is to be introduced into the pneumatic chambers from the compressor 9 or from the primary reservoir 10.

The pressure control valves 12g, 12h, 12i and 12j controls communication between respectively corresponding pneumatic chambers 4 and the auxiliary reservoir tanks 11a, 11b, 11c, and 11d. The auxiliary reservoir chambers 11a, 11b, 11c and 11d serve as damping characteristics adjusting means for softening the damping characteristics when in communication with the pneumatic chamber and for hardening when out of communication with the pneumatic chamber. In addition, by adjusting the pneumatic pressure in the pneumatic chamber 4, vehicle height can be controlled by lowering and rising the vehicle body relative to the wheel axle.

In order control the valve positions, the pressure control valves 12a to 12j are all connected to a controller 20. The controller 20 is, in turn, connected to vehicle height sensors 15a, 15b, 15c and 15d which monitor the vertical position of the corresponding piston rod 5 and continuously output height-indicative signals DHa, DHb, DHc and DHd indicative of the piston rod positions. As will be appreciated, the height-indicative signals DHa, DHb, DHc and DHd are representative of the relative distance between the vehicle body and the wheel axle at each suspension systems 1a, 1b, 1c and 1d. The controller 20 is also connected to a vehicle speed sensor 16 which monitors vehicle speed V and continuously outputs a vehicle speed-indicative signal DV. Based on the height-indicative signals DHa, DHb, DHc and DHd from the vehicle height sensor 15a, 15b, 15c and 15d and the vehicle speed-indicative signal DV from the vehicle speed sensor 16, the controller 20 derives control signals for each of the pressure control valves 12a to 12j.

It should be noted that the vehicle height sensors 15a, 15b, 15c and 15d employed in the preferred embodiment of the vehicle height control system respectively comprise appropriate transducers, such as potentiometers, which convert vertical displacement of the piston rods 5 relative to the shock absorber cylinders or the suspension struts into corresponding electrical potential.

Figure 3:
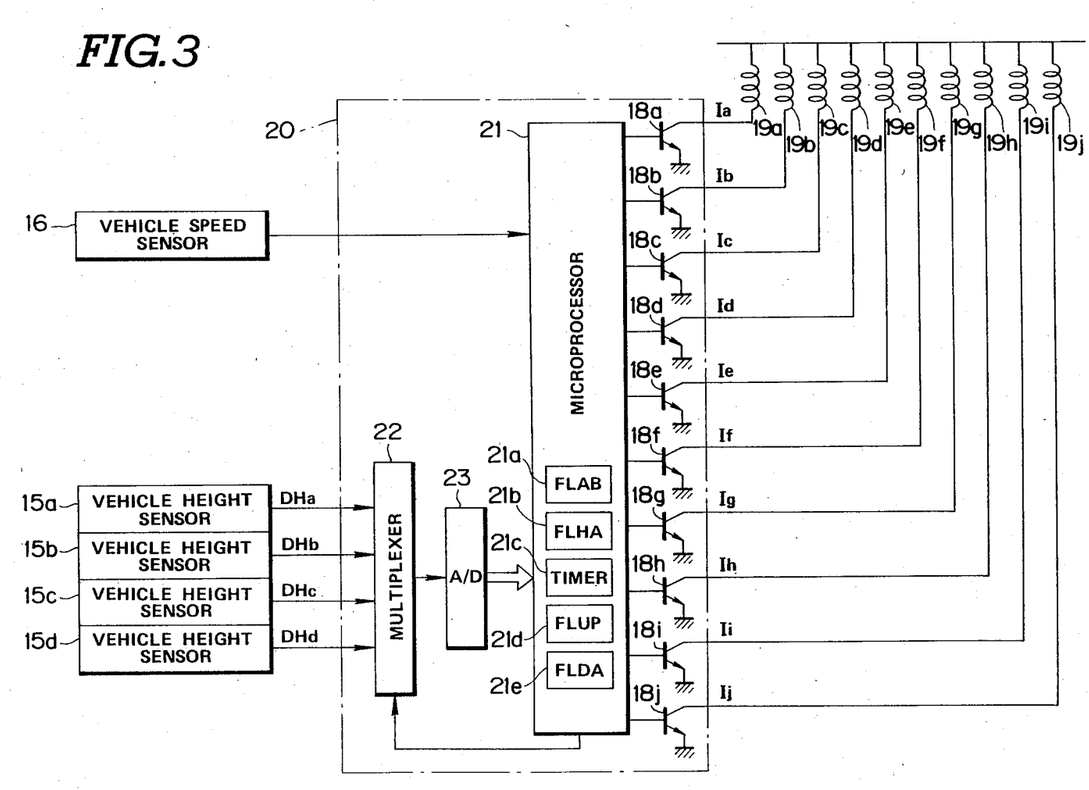
FIG. 3 is a schematic block diagram of a controller in the preferred embodiment of the automotive vehicle height control system of FIG. 2.

As shown in FIG. 3, the controller 20 has a multiplexer 22 through which the height indicative signals DHa, DHb, DHc and DHd are received. The multiplexer 22 inputs one of the height indicative signals DHa, DHb, DHc and DHd to an analog-to-digital (A/D) converter 23 and to a microprocessor 21. The microprocessor 21 has output ports to which the base terminals of switching transistors 18a to 18j are connected. Collector electrodes of the switching transistors 18a to 18j are connected to respective solenoid coils 19a to 19j of the pressure control valves 12a to 12j. The transistors 18a to 18j are turned ON and OFF depending upon output levels at the corresponding output ports of the microprocessor 21 to energize and deenergize the solenoid coils 19a to 19j.

The microprocessor 21 is of a well known structure including an input unit, RAM, ROM, a CPU and an output unit. The output unit has the output ports connected to the base electrodes of the switching transistors 18a to 18j.

The operation of the controller 20 will be described herebelow with reference to FIGS. 4 to 7, wherein the preferred embodiment of the vehicle height control program is shown.

Figure 4:
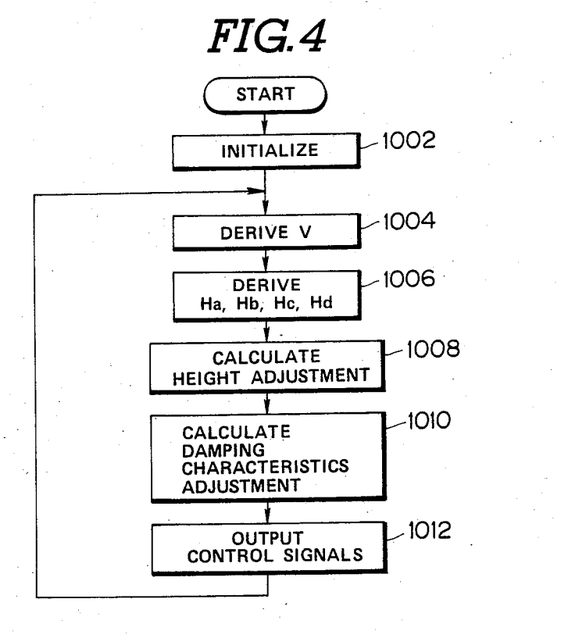
FIG. 4 is a flowchart of a main control program executed by the controller of FIG. 3.

FIG. 4 shows a main control program to be executed periodically. The main control program is triggered by closing a main power switch of the vehicle, i.e. an ignition switch (not shown). Immediately after being triggered, the controller 20 is initialized at a step 1002. Thereafter, the vehicle speed indicative signal DV is read out, at a step 1004. In the step 1004, the vehicle speed value V is derived from the vehicle speed-indicative signal value. The derived vehicle speed V is stored in an appropriate memory block of RAM as a vehicle speed-indicative value. Then, the height-indicative signals DHa, DHb, DHc and DHd are read out in the given order and the heights of the vehicle at each of the suspension systems 1a, 1b, 1c and 1d are derived at a step 1006. The height values at the respective suspension systems 1a, 1b, 1c and 1d are stored in appropriate memory blocks of RAM as height data Ha, Hb, Hc and Hd. After this, at a step 1008, a height control calculation routine is executed. The height control calculation routine is shown in detail in FIG. 5 and will be described later. As a result of execution of the step 1008, the valve positions of the respective pressure control valves 12a to 12f are derived. After the step 1008, damping characteristics control calculation routine is executed at a step 1010. In the damping characteristics control calculation routine of step 1010, the valve positions of the pressure control valves 12g to 12j are derived. After the step 1010, the control signals are output to control the switching transistors 18a to 18j and thus control energization and deenergization of the solenoid coils 19a to 19j of the pressure control valves 12a to 12j, at a step 1012.

It should be appreciated that each of the switching transistors 18a to 18j is turned ON in response to a HIGH-level output at the corresponding output port of the microprocessor 21. When a switching transistor is turned ON, the electric current from a power source flows through the corresponding solenoid coil and the collector-emitter path of the transistor to ground. Therefore, the solenoid coil is energized to open the corresponding pressure control valve. On the other hand, when the output level at the output port is held LOW, the transistor remains OFF so as to block current flow from the power source. Therefore, the solenoid coil remains deenergized and the valve of the corresponding pressure control valve remains closed.

It should be noted that the height control calculation routine at the step 1008, the damping characteristics calculation routine at the step 1010 and the control signal output routine at the step 1012 are executed for each of the front-left, front-right, rear-left and rear-right suspension systems independently. In the following disclosure, for each of the steps 1008, 1010 and 1012, only one cycle of operation for control of a single pressure control valve will be described. However, it should be understood that same control operation will be performed for each of the suspension systems.

Accordingly, in the following description, the vehicle height indicative signals DHa, DHb, DHc and DHd will be generally represented by DHi and the vehicle height indicated by the vehicle height-indicative signal DHi will be represented by Hi. In addition, the pressure control valve 12a will be referred to as "exhaust valve 12a", the pressure control valve 12b will be referred to as "pressure reservoir control valve 12b", the pressure control valves 12c to 12f will be generally represented by "pressure induction valve 12in" and the pressure control valves 12g to 12j will be represented by "damper control valve 12dp"

Figure 5:
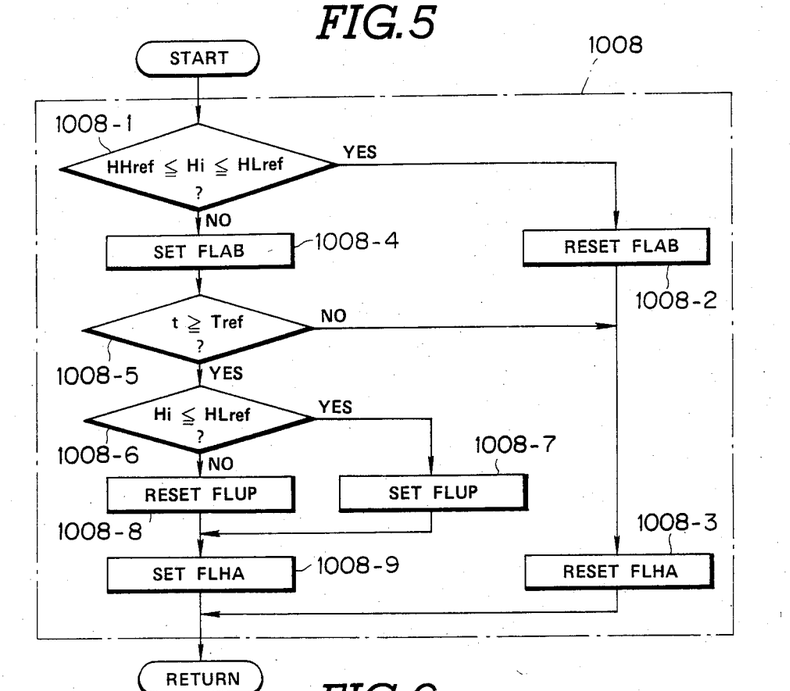
FIG. 5 is a flowchart of a subroutine of the maint control program of FIG. 4, in which a height control judgment is carried out.

In the height control calculation routine of FIG. 5, first, the vehicle height indicative signal value Hi is compared to predetermined upper and lower threshold values HHref and HLref, at a step 1008-1. The upper and lower threshold values HHref and HLref define an allowable range of vehicle height, within which vehicle height adjustment is not required. The upper and lower threshold values HHref and HLref are derived by adding and subtracting a given value ΔH to and from a predetermined reference value Ho representative of the standard vehicle height. The given value ΔH may be related to the specific type and nature of the vehicle. If the vehicle height-indicative signal value Hi is equal to or less than the upper threshold value HHref and is equal to or greater than the lower threshold value HLref, then the program goes to steps 1008-2 and 1008-3 in which an abnormal vehicle height-indicative flag FLAB and a height adjustment flag FLHA in flag registers 21a and 21b are reset to logical "0" or LOW.

On the other hand, if the vehicle height-indicative signal value Hi is greater than the upper threshold value HHref or less than the lower threshold value HLref, the abnormal vehicle height-indicative flag FLAB is set in a step 1008-4. In the subsequent step 1005, the period of time for which the vehicle height remains outside of the allowable range is checked to see whether the vehicle height remains outside of the allowable range over a period longer than a given period T. To enabling this, a timer 21c will be started when the vehicle height-indicative signal value Hi first exceeds the upper threshold value HHref or drops below the lower threshold value HLref. In tep 1008-5, the timer value t is compared with a timer reference Tref which is representative of the given period T. Until the timer value t becomes equal to or greater than the timer reference Tref, the program goes to the step 1008-2 in which the flag FLHA is eset. If the vehicle height indicative signal value Hi should return within the range between the upper reference value HHref and the lower reference value HLref before the timer value reaches the timer reference Tref, then the timer 21c is reset as part of step 1008-1.

On the other hand, if the timer value t should equal or exceed the timer reference Tref when checked at the step 1008-3, then the vehicle height-indicative signal value Hi is checked in step 1008-6 to see if it is equal to or less than the lower threshold HLref, which would indicate that the vehicle height should be increased to return the same to the allowable range. If the vehicle height-indicative signal value Hi is equal to or less than the lower threshold value HLref and thus the answer at the step 1008-6 is YES, a raise-demand indicative flag FLUP is set in a flag register 21d of the microprocessor, at a step 1008-7. On the other hand, if the vehicle height-indicative signal value Hi is greater than the lower threshold value HLref, which means that the vehicle is too high, the raise-demand-indicative flag FLUP is reset at a step 1008-8. After either step 1008-7 or step 1008-8, the program goes to a step 1008-9, in which the height adjustment flag FLHA is set.

Control returns to the main control program after either of steps 1008-3 or 1008-9 of FIG. 5.

Figure 6:
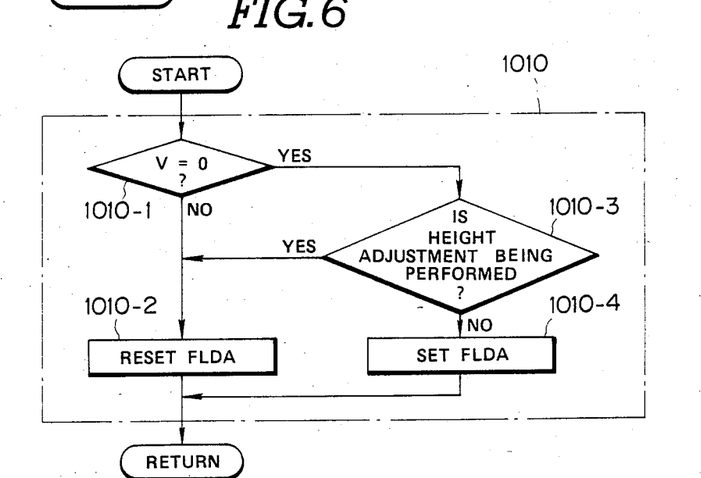
FIG. 6 is a flowchart of a subroutine of the main control program of FIG. 4, in which a damping characteristics control judgment is carried out.

In the damping characteristics control calculation routine of FIG. 6, at an initial step 1010-1, the vehicle speed-indicative signal value V is checked so as to judge whether the vehicle is moving or at rest. If the vehicle is moving and thus the vehicle speed-indicative signal value is non-zero, a harder damper indicative flag FLDA in a flag register 21e of the microprocessor 21 is reset at a step 1010-2. On the other hand, if the vehicle is at a rest when checked at the step 1010-1, then the CPU checks at a step 1010-3 to see if any of the suspension systems are currently undergoing height adjustment or damping characteristics adjustment by the control program. If height adjustment of any of the other suspension systems is in operation, then control passes to the step 1010-2 in order to reset the harder damper indicative flag FLDA. Otherwise, the harder damper indicative flag FLDA is set at a step 1010-4.

Control returns from the step 1010 to the main control program after either of steps 1010-2 or 1010-4 of FIG. 6.

Figure 7:
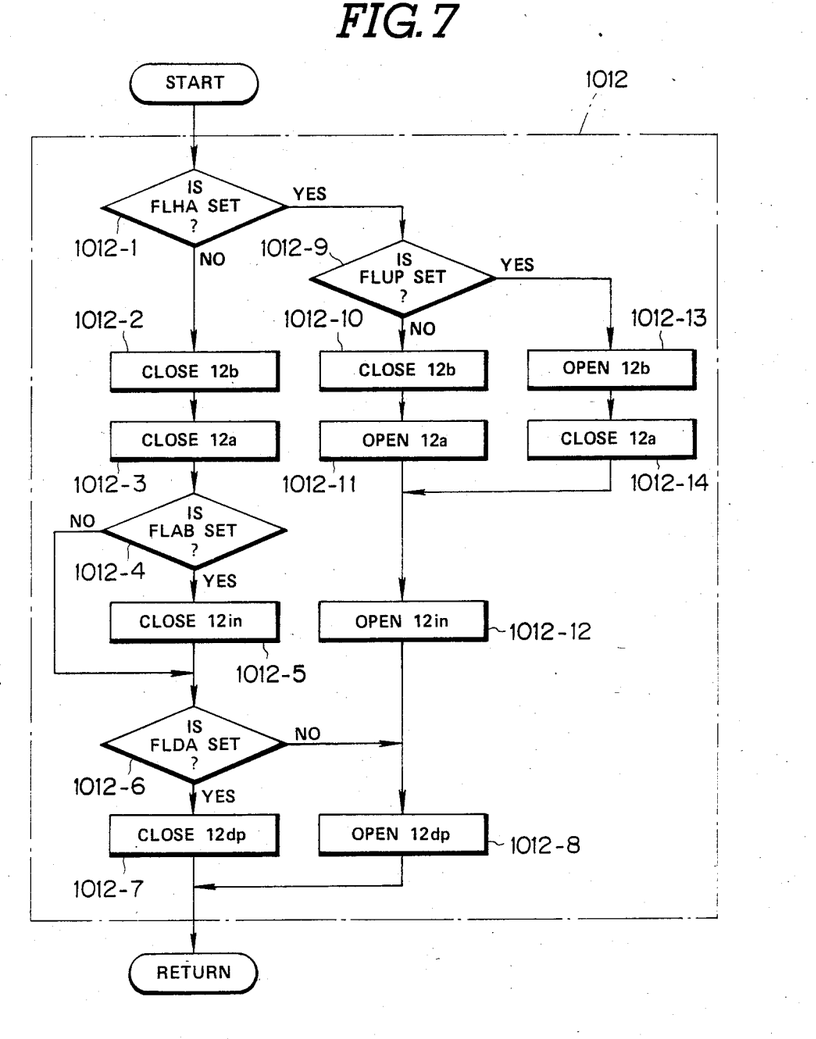
FIG. 7 is a flowchart of a subroutine of the main control program for performing valve control for vehicle height adjustment and damping characteristics control.

After execution of the steps 1008 and 1010, the control signal output routine at the step 1012 of FIG. 7 is executed. First, the height adjustment indicative flag FLHA is checked at a step 1012-1 to see whether it is set or reset. If the height adjustment indicative flag FLHA is reset, the pressure control signal ordering closure of the pressure reservoir control valve 12b is output at a step 1012-2. Likewise, an exhaust valve control signal for closing the exhaust valve 12a is output at a step 1012-3. Thereafter, the abnormal vehicle height indicative flag FLAB in the flag register 21a of the microprocessor 21 is checked at a step 1012-4. If the abnormal vehicle height indicative flag FLAB is set, the pressure induction valve control signal ordering closure of the pressure induction valve 21in is output at a step 1012-5. Then at a step 1012-6, the harder damper indicative flag FLDA is checked. If the harder damper indicative flag FLDA is set when checked at the step 1012-6, then the damper control signal ordering closure of the damper control valve 12dp is output at a step 1012-7.

On the other hand, if the abnormal vehicle height indicative signal FLAB is not set when checked at the step 1012-4, then the program jumps past the step 1012-5 to step 1012-6. Since the pressure induction valve control signal ordering cclosure of the pressure induction control valve 12*in* is not output, the pressure induction control valve remains in its current position.

If the harder damper indicative flag HLDA is reset when checked at the step 1012-6, then control passes to a step 1012-8 in which the damper control signal ordering the damper control valve 12*dp* opened is output.

If the height adjustment indicative flag FLHA is set when checked at the step 1012-1, then the raise-demand-indicative flag FLUP is checked at a step 1012-9. If the raise-demand-indicative flag FLUP is not set when checked at the step 1012-9, then the pressure reservoir control signal ordering closure of the pressure reservoir control valve 12*b* is output at a step 1012-10. Thereafter, the exhaust valve control signal ordering the exhaust valve 12*a* opened is output at a step 1012-11. Then, the pressure induction control signal ordering the pressure induction valve 12*in* opened is output at a step 1012-12. After execution of the step 1012-12, the control passes to the step 1012-8 in which the damper control valve 12*dp* is opened.

On the other hand, if the raise-demand-indicative flag FLUP is set when checked at the step 1012-9, then the program goes to a step 1012-13 in which the pressure reservoir control signal ordering the pressure reservoir control valve 12*b* opened is output. The exhaust valve control signal ordering closure of the exhaust valve 12*a* is then output at a step 1012-14. After the step 1012-14, the program goes to the step 1012-12 in which the pressure induction control valve 12*in* is opened.

In summary, when the vehicle height exceeds or drops below the given criteria represented by the upper and lower threshold values HHref and HLref, the abnormal vehicle height indicative flag FLAB is set. In response thereto, the pressure induction control signal is output in order to close the pressure induction valve 12*in*. At this time, the pressure accumulation control valve 12*b* and the exhaust valve 12*a* are closed. Therefore, the pneumatic pressure chamber 4 is blocked from communication with the pressure supply circuit. As a result, the pneumatic pressure in the pneumatic pressure chamber 4 is held at the pressure level obtaining at the time the abnormal vehicle height indicative flag FLAB was first set.

This valve condition is maintained until the given period T expires while the vehicle height remains outside of the allowable range defined by the upper and lower threshold values HHref and HLref or until the vehicle height returns to within the allowable range.

If the afore-mentioned valve condition continues for longer than the given period of time T, then the height adjustment indicative flag FLHA is set. Also, a judgment is made as to whether the vehicle height must be increased or decreased. If the vehicle height is to be raised, the raise-demand-indicative flag FLUP is set.

In order to raise the vehicle, the pneumatic pressure in the pneumatic pressure chamber 4 must be increased. Therefore, the pressure induction control valve 12*in* must be opened to deliver pneumatic pressure from the primary reservoir 10 and/or the compressor 9. At this time, the exhaust valve 12*a* must be closed and the pressure accumulation control valve 12*b* must be open.

Due to the increase in the pneumatic pressure in the pneumatic pressure chamber 4, the stiffness of the suspension system necessarily increases. In order to compensate for this change in riding comfort, the damping characteristics of the suspension system must be softened. This can be done by opening the damper control valve 12*dp* so as to expand the effective volume of the pneumatic pressure chamber by establishing communication between the pneumatic chamber 4 and the auxiliary reservoir tank 11.

On the other hand, when the vehicle is to be lowered, the pneumatic pressure in the pneumatic pressure chamber 4 must be reduced. Therefore, the exhaust valve 12*a* must be opened to discharge the pneumatic pressure in the pressure supply circuit and so reduce the pneumatic pressure in the pneumatic pressure chamber 4. At this time, the pressure reservoir control valve 12*b* must be closed so that sufficient pneumatic pressure can be maintained in the primary reservoir tank 10. The pressure inductive control valve 12*in* must be held open to maintain communication between the pneumatic pressure chamber 4 and the pressure supply circuit.

Assuming height adjustment and damping characteristics adjustment are being performed for the front-left suspension system 1*a*, the vehicle height indicative signal DHa from the vehicle height sensor 15*a* is taken as the control parameter.

When one or more passengers enter the vehicle cabin, the vehicle height may drop below the lower vehicle height criterion represented by the lower threshold value HLref. Thus, the signal value Ha of the vehicle height indicative signal DHa of the vehicle height sensor 15*a* becomes equal to or less than the lower threshold value HLref. Therefore, the abnormal vehicle height indicative flag FLAB is set at the step 1008-4 of the height adjustment calculation routine of FIG. 5. The height adjustment indicative flag FLHA is not set until the period has expired. Therefore, the pressure reservoir control signal output to the switching transistor 18*b* selected to be at the LOW level and the exhaust control signal output to the switching transistor 18*a* is also LOW (steps 1012-2 and 1012-3). At the same time, the pressure induction control signal for the switching transistor 18*c* is LOW. Therefore, the pressure reservoir control valve 12*b*, the exhaust valve 12*a* and the pressure induction control valve 12*c* are all held closed.

Since the lowering of the vehicle was due to an increase in the load applied to the vehicle as the passengers boarded, the vehicle height will not return to the allowable range until height control is performed. Therefore, the vehicle height indicative signal value Ha will remain equal to or less than the lower threshold value HLref for longer than the given period of time. Therefore, after the given period T, the height adjustment indicative flag FLHA is set at the step 1008-9 of the height adjustment calculation routine of FIG. 5. Since the need for height adjustment is due to a drop in the vehicle level below the lower vehicle height criterion, the raise-demand-indicative flap FLUP is set at a step 1008-7.

In response to setting of the height adjustment indicative flag FLHA and the raise-demand-indicative flag FLUP, the pressure reservoir control signal for the switching transistor 12*b* is derived to be HIGH so as to turn ON the transistor and so energize the solenoid coil 19*b* to open the pressure reservoir control valve 12*b*, at the step 1012-12. Simultaneously, a LOW-level exhaust valve control signal is output to the switching transistor 18*a* to hold the transistor OFF and the solenoid coil 19*a* deenergized in order to keep the exhaust valve 12*a* closed, at a step 1012-13. A HIGH-level pressure induction control signal is then output to turn ON the switching transistor 18c and so open the pressure induction control valve 12c. Therefore, the pressure in the pneumatic pressure chamber 4 of the suspension system 1a is increased to raise the vehicle until it exceeds the lower vehicle height criterion.

On the other hand, until the vehicle is heavily loaded or starts to move, the harder damper indicative flag FLDA remains reset. Therefore, the damper control signal for the switching transistor 18g is held LOW. The transistor 18g is thus held OFF to keep the solenoid coil 19g of the damper control valve 12g deenergized. Therefore, the pneumatic pressure chamber 4 is out of communication with the auxiliary reservoir tank 11a. The volume of the pneumatic pressure chamber 4 is thus held at its smaller effective value, so as to effect the higher level of stiffness of the suspension system. This condition continues until height adjustment becomes necessary or until the vehicle starts to move. This satisfactorily and successfully prevents winding-up of the vehicle as the vehicle starts to move.

When the vehiccle starts moving, the harder damper indicative flag FLDA is reset. Therefore, the damper control signal goes HIGH to turn ON the transistor 18g. As a result, the solenoid coil 19g is energized to open the damper control valve 12g. This increases the effective volume of the pneumatic pressure chamber 4 and so reduces the stiffness of the suspension system 1a.

On the other hand, when height adjustment is being carried out for any of the suspension systems, the harder damper indicative flag FLDA is reset at the step 1010-2. Therefore, when height adjustment is being performed in one of the suspension systems 1a, 1b, 1c or 1d, the pneumatic pressure chambers 4 are all kept in communication with the corresponding auxiliary reservoir tanks 11. Therefore, the pneumatic pressure in the auxiliary pressure reservoirs 11 will be equalized to that in the pneumatic pressure chambers 4. Therefore, when the damper control valve 12g is closed thereafter, the pneumatic pressure in the auxiliary reservoir tank 11a will be equal to that in the pnuematic pressure chamber 4. Therefore, even when the damper control valve 12g is again opened thereafter, the establishment of communication between the pneumatic pressure chamber 4 and the auxiliary reservoir tank 11a will not influence the vehicle height. This successfully prevents any changes in vehicle height in response to switching of the damping characteristics between HARD and SOFT.

While the preferred embodiment set forth above is directed toward a vehicle height control system for adjusting vehicle height to within a given allowable range, it would be possible to change the vehicle height depending upon other parameters, such as vehicle speed, road roughness or so forth. Vehicle speed-dependent height control has been disclosed in the co-pending U.S. patent application Ser. No. 573,504, filed on Jan. 24, 1984, which corresponds to the European Patent First Publication No. 01 12 700, published on Aug. 1, 1984. The contents of the above-identified co-pending U.S. patent application and of the European Patent First Publication are hereby incoportated by reference for the sake of disclosure. Also, although the damping characteristics of the preferred embodiment have been controlled in either of two modes, i.e. HARD mode and SOFT mode, it would be possible to vary damping characteristics in more than two modes. Furthermore, although the damping characteristics of the shown embodiment are controlled by varying the effective volume of the pnuematic chamber, it can be varied by changing damping characteristics of a hydraulic shock absorber forming part of the suspension system, or by changing the resiliency of a roll stabilizer or the like. Such variable damping force shock absorbers and adjustable roll stablizers have been disclosed in the European Patent First Publication No. 01 35 902, published on Apr. 3, 1985. The contents of this European Patent First Publication are hereby incorporated by reference for the sake of disclosure.

Also, the controller and routines disclosed hereabove can be embodied in various ways without departing from the principle of a invention. For example, in the shown embodiment, the vehicle height sensor comprising a potentiometer is employed. However, the vehicle height sensor may comprise an ultra-sonic sensor, such as is disclosed in the aforementioned European Patent First Publication No. 01 35 902. Therefore, the invention should be understood to include all possible embodiments and modifications to the shown embodiment, which do not depart from the features set out in the appended claims.

What is claimed is:

1. A height control system for an automotive vehicle comprising:
    an actuator means, disposed between a vehicle body and a vehicular wheel axle, for adjusting the vertical separation between said vehicle body and said wheel axle by controlling an actuator so as to adjust vehicle height to a given height;
    a damper control means, cooperative with said actuator means, for adjusting damping characteristics of a vehicular suspension system, which damper control means adjusts the damping characteristics by adjusting a damper pressure relative to said actuator pressure;
    a vehicle height sensor for monitoring vehicle height and producing a vehicle height indicative signal;
    a detector responsive to said vehicle height indicative signal for detecting when the vehile height lies outside of a predetermined height range; and
    a controller responsive to said detector detecting vehicle height outside of said predetermined height range for operating said actuator means to adjust said actuator pressure so as to adjust the vehicle height to within said predetermined height range, said controller also operating said damper control means so as to hold said damper pressure substantially equal to said actuator pressure during height adjustment.

2. The height control system as set forth in claim 1, wherein said actuator means comprises a pneumatic actuator connected to a pneumatic pressure source through a pressure supply circuit, and a pressure control valve establishing and blocking fluid communication between said pneumatic actuator and said pneumatic pressure source, and wherein said controller operates said pressure control valve in order to adjust said actuator pressure.

3. The vehicle height control system as set forth in claim 2, wherein said damper control means comprises a pneumatic pressure reservoir connected to said actuator for fluid communication therebetween, and a damper control valve disposed between said actuator and said pneumatic pressure reservoir for establishing and blocking fluid communication therebetween, and said controller opens said damper control valve to establish fluid communication between said actuator and said pneumatic pressure reservoir.

4. The vehicle height control system as set forth in claim 1, wherein said actuator means includes pneumatic actuators associated with said vehicular suspension system, one arranged at each of front and rear suspensions and adapted to adjust the vertical separation between the vehicle body and the wheel axle at the corresponding suspension independently of other of said actuators, and said damper control means includes pneumatic chambers, one connected to each one of said pneumatic actuators.

5. The height control system as set forth in claim 4, wherein each of said actuators comprises a pneumatic chamber connected to a pneumatic pressure source through a pressure supply circuit, and a pressure control valve establishing and blocking fluid communication between said pneumatic chamber and said pneumatic pressure source, and said controller operates said pressure control valve in order to adjusting said actuator pressure.

6. The vehicle height control system as set forth in claim 5, wherein said damper control means further comprises a damper control valve disposed between said pneumatic chamber of said actuator and said pneumatic chamber of said damper control means for establishing and blocking fluid communication therebetween, and said controller opens said damper control valve to establish fluid communication between said pneumatic chamber of said actuator and said pneumatic chamber of said damper control means so as to expand the effective volume of the pneumatic chamber of said actuator and thereby soften the damping characteristics of the suspension system.

7. The vehicle height control system as set forth in claim 6, wherein said controller opens all of said damper control valves during height adjustment by any one of said pneumatic actuators.

8. The vehicle height control system as set forth in claim 1, which further comprises a vehicle speed sensor monitoring vehicle speed and producing a vehicle speed indicative signal, and said controller is responsive to a vehicle speed indicative signal value indicative of the vehicle being at rest to operate said damper control means to harden said suspension system.

9. The vehicle height control system as set forth in claim 1, wherein said actuator means includes pneumatic actuators associated with said vehicular suspension system, one arranged at each of front and rear suspensions and adapted to adjust the vertical separation between the vehicle body and the wheel axle at the corresponding suspension independently of other of said actuators, and said damper control means includes pneumatic chambers, one connected to each one of said pneumatic actuators.

10. The height control system as set forth in claim 4, wherein each of said actuators comprises a pneumatic chamber connected to a pneumatic pressure source through a pressure supply circuit, and a pressure control valve establishing and blocking fluid communication between said pneumatic chamber and said pneumatic pressure source, and said controller operates said pressure control valve in order to adjusting said actuator pressure.

11. The vehicle height control system as set forth in claim 5, wherein said damper control means further comprises a damper control valve disposed between said pneumatic chamber of said actuator and said pneumatic chamber of said damper control means for establishing and blocking fluid communication therebetween, and said controller opens said damper control valve to establish fluid communication between said pneumatic chamber of said actuator and said pneumatic chamber of said damper control means so as to expand the effective volume of the pneumatic chamber of said actuator and thereby soften the damping characteristics of the suspension system.

12. The vehicle height control system as set forth in claim 6, wherein said controller opens all of said damper control valves during height adjustment by any one of said pneumatic actuators.

13. A height control system for an automotive vehicle comprising:
 a suspension strut disposed between a vehicle body and a vehicular wheel axle;
 a first pneumatic chamber associated with said suspension strut and adapted to adjust the vertical separation between said vehicle body and said wheel axle by controlling a pressure therein so as to hold vehicle height at a given height;
 a second pneumatic chamber connected to said first pneumatic chamber through a communication passage;
 a pneumatic pressure supply circuit connected to said first pneumatic chamber for introducing and exhausting the pneumatic pressure into and from said first pneumatic chamber for adjusting the pneumatic pressure within the latter;
 a pressure control valve means disposed within said pneumatic pressure supply circuit, for controlling introduction and exhausting of the pneumatic pressure in said first pneumatic chamber;
 a damper control valve means disposed within said communication passage for establishing and blocking communication between said first and second pneumatic chambers for adjusting the effective volume of the first pneumatic chamber;
 a vehicle height sensor for monitoring vehicle height and producing a vehicle height indicative signal;
 a detector responsive to said vehicle height indicative signal for detecting when the vehicle height lies outside of a predetermined height range; and
 a controller responsive to said detector detecting said vehicle height outside of said predetermined height range for operating said pressure control valve means so as to adjust vehicle height to within said predetermined height range, said controller also operating said damper control valve means so as to hold said damper control valve means open during vehicle height adjustment.

14. The vehicle height control system as set forth in claim 13, which comprises four first pneumatic chambers, each connected to a corresponding second pneumatic chamber, for adjusting vehicle height at corresponding one of front and rear suspension struts.

15. The vehicle height control system as set forth in claim 14, wherein said controller is responsive to vehicle height adjustment performed by any one of said first chambers for operating said damper control valves so as to establish communication between all pairs of first and second pneumatic chambers.

16. In a height control system for an automotive vehicle comprising:
 a suspension strut disposed between a vehicle body and a vehicular wheel axle;

a first pneumatic chamber associated with said suspension strut and adapted to adjust the vertical separation between said vehicle body and said wheel axle by controlling a pressure therein so as to hold vehicle height at a given height;

a second pneumatic chamber connected to said first pneumatic chamber through a communication passage;

a pneumatic pressure supply circuit connected to said first pneumatic chamber for introducing and exhausting the pneumatic pressure into and from said first pneumatic chamber for adjusting the pneumatic pressure within the latter;

a pressure control valve means disposed within said pneumatic pressure supply circuit, for controlling introduction and exhausting of the pneumatic pressure in said first pneumatic chamber;

a damper control valve means disposed within said communication passage for establishing and blocking communication between said first and second pneumatic chambers for adjusting the effective volume of the first pneumatic chamber;

a vehicle height sensor for monitoring vehicle height and producing a vehicle height indicative signal;

a detector responsive to said vehicle height indicative signal for detecting when the vehicle height lies outside of a predetermined height range, and a controller for controlling operation of said pressure control valve means and said damper control valve means, a process for performing vehicle height control comprising the steps of:

monitoring varition of said vehicle height indicative signal value and detecting when vehicle height lies outside of a predetermined range;

opening said damper control valve in response to a vehicle height indicative signal value indicative of a vehicle height outside of said predetermined range;

measuring elapsed time starting from detection of said vehicle height indicative signal value indicative of vehicle height outside of said predetermined range and continuing for as long as the vehicle height remains outside of said predetermined range;

when said elapsed time exceeds a predetermined period, operating said pressure control valve so as to adjust pnuematic pressure in said first pneumatic chamber in order to return the vehicle height within said predetermined range; and holding said damper control valve open during said pressure control valve operation step.

17. The process as set forth in claim 16, which further comprises a step of monitoring vehicle speed and holding said damper control valve closed while the vehicle speed is zero.

18. The process as set forth in claim 16, in which said pressure control valve operation and damper control valve operation steps are performed for each of front and rear suspension systems so as to adjust the vertical separation between said vehicle body and said wheel axle at each of said suspension systems independently.

19. The process as set forth in claim 18, which further comprises a step of holding said damper control valve means open during pressure control valve operation performed for any one of the suspension systems.

* * * * *